(12) United States Patent
Nagashima et al.

(10) Patent No.: US 12,138,786 B2
(45) Date of Patent: Nov. 12, 2024

(54) TEACHING DEVICE, TEACHING METHOD, AND RECORDING MEDIUM

(71) Applicant: SEIKO EPSON CORPORATION, Tokyo (JP)

(72) Inventors: Yoshiki Nagashima, Shiojiri (JP); Masaaki Hagio, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 362 days.

(21) Appl. No.: 17/666,588

(22) Filed: Feb. 8, 2022

(65) Prior Publication Data

US 2022/0250237 A1 Aug. 11, 2022

(30) Foreign Application Priority Data

Feb. 10, 2021 (JP) .................................. 2021-020161

(51) Int. Cl.
  *B25J 9/00* (2006.01)
  *B25J 9/04* (2006.01)
  *B25J 9/16* (2006.01)
  *G06F 3/04817* (2022.01)

(52) U.S. Cl.
  CPC ............. *B25J 9/0081* (2013.01); *B25J 9/042* (2013.01); *B25J 9/1689* (2013.01); *G06F 3/04817* (2013.01)

(58) Field of Classification Search
  CPC ........ B25J 9/0081; B25J 9/042; B25J 9/1689; G06F 3/04817
  See application file for complete search history.

(56) References Cited

U.S. PATENT DOCUMENTS

| 2006/0229766 | A1 | 10/2006 | Setsuda |
| 2009/0289591 | A1 | 11/2009 | Kassow et al. |
| 2018/0036883 | A1* | 2/2018 | Nishitani ............... B25J 9/1671 |
| 2019/0042066 | A1* | 2/2019 | Kim ..................... H04M 1/725 |
| 2020/0001454 | A1* | 1/2020 | Iwasa ....................... B25J 9/023 |
| 2020/0126249 | A1* | 4/2020 | Tang ......................... G06F 3/01 |
| 2020/0353619 | A1* | 11/2020 | Sato .......................... B25J 9/06 |
| 2021/0154844 | A1* | 5/2021 | Ooba ..................... B25J 9/1671 |

FOREIGN PATENT DOCUMENTS

| JP | H10146782 A | 6/1998 |
| JP | 2006289531 A | 10/2006 |
| JP | 2016175143 A | 10/2016 |

* cited by examiner

*Primary Examiner* — Behrang Badii
*Assistant Examiner* — Jay Khandpur
(74) *Attorney, Agent, or Firm* — Samson G. Yu (57) ABSTRACT

A teaching device generating an operation program for executing an operation of a robot having a base and a robot arm including a proximal arm coupled to the base and a distal arm coupled to a side opposite to the base of the proximal arm is provided. The teaching device includes: a display unit displaying a first operation unit accepting an operation of designating the proximal arm of the robot arm and changing an attitude of the robot arm and a second operation unit accepting an operation of designating a position of a control point set for the robot arm and changing the attitude of the robot arm; and an operation program generation unit generating the operation program, based on the attitude designated at the first operation unit or the second operation unit.

9 Claims, 8 Drawing Sheets

TEACHING DEVICE, TEACHING METHOD, AND RECORDING MEDIUM

The present application is based on, and claims priority from JP Application Serial Number 2021-020161, filed Feb. 10, 2021, the disclosure of which is hereby incorporated by reference herein in its entirety.

BACKGROUND

1. Technical Field

The present disclosure relates to a teaching device, a teaching method, and a recording medium.

2. Related Art

Recently, due to a steep rise in labor costs and a shortage of skilled workers in plants, the use of various robots and robot peripheral devices has been accelerating the automation of tasks that have previously been handled manually. A teaching device generating an operation program to be executed by such robots is known.

For example, a teaching device described in JP-A-10-146782 displays a graphic image of a robot and a touch key designating an operation of a moving part such as an arm or a wrist, on a display screen with a touch panel. A worker touches a button such as a "base coordinate", "joint coordinate" or "tool coordinate" button in the form of a touch key and subsequently performs various operations and thus causes the robot to move in the displayed direction. The worker then stores a desired attitude of the robot, thus giving a teaching.

However, the teaching device described in JP-A-10-146782 only displays the names of coordinate systems. Therefore, a beginner may select a coordinate system that is not suitable for a desired attitude to be taught, and may take some time to achieve the desired attitude to be taught. In some cases, it is difficult to give an accurate teaching.

SUMMARY

A teaching device according to an aspect of the present disclosure generates an operation program for executing an operation of a robot having a base and a robot arm including a proximal arm coupled to the base and a distal arm coupled to a side opposite to the base of the proximal arm. The teaching device includes: a display unit displaying a first operation unit for performing an operation of designating the proximal arm of the robot arm and changing an attitude of the robot arm and a second operation unit for performing an operation of designating a position of a control point set for the robot arm and changing the attitude of the robot arm; and an operation program generation unit generating the operation program, based on the attitude designated at the first operation unit or the second operation unit.

A teaching method according to another aspect of the present disclosure includes: a display step of displaying a first operation unit for performing an operation of designating a proximal arm of a robot arm and changing an attitude of the robot arm and a second operation unit for performing an operation of designating a position of a control point set for the robot arm and changing the attitude of the robot arm; and an operation program generation step of generating an operation program for executing an operation of a robot having the robot arm, based on the attitude designated at the first operation unit or the second operation unit.

A recording medium according to still another aspect of the present disclosure stores a teaching program. The teaching program executes: a display step of displaying a first operation unit for performing an operation of designating a proximal arm of a robot arm and changing an attitude of the robot arm and a second operation unit for performing an operation of designating a position of a control point set for the robot arm and changing the attitude of the robot arm; and an operation program generation step of generating an operation program for executing an operation of a robot having the robot arm, based on the attitude designated at the first operation unit or the second operation unit.

DESCRIPTION OF EXEMPLARY EMBODIMENTS

First Embodiment

Figure 1:
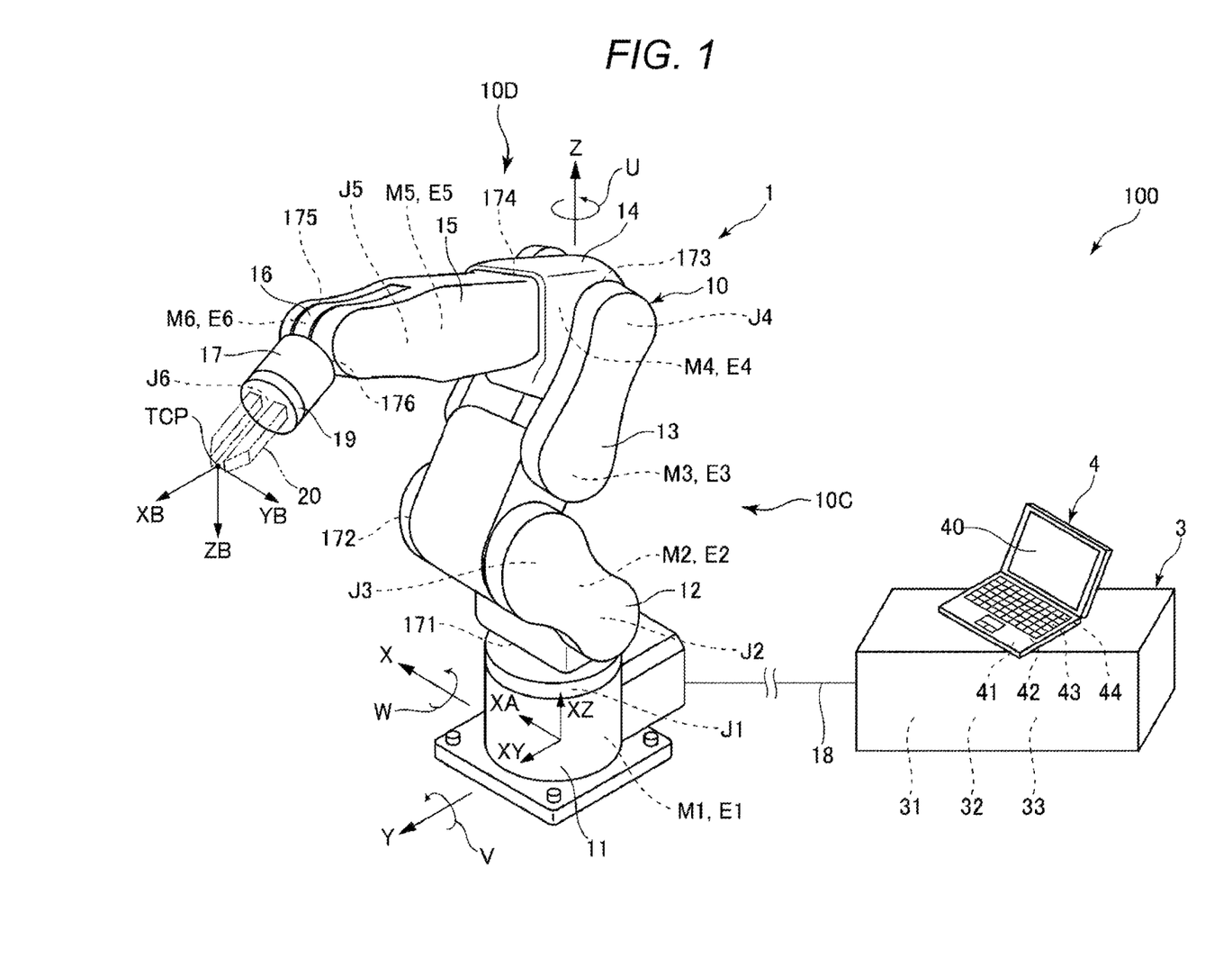
FIG. 1 shows an overall configuration of a robot system having a first embodiment of the teaching device according to the present disclosure.
Figure 2:
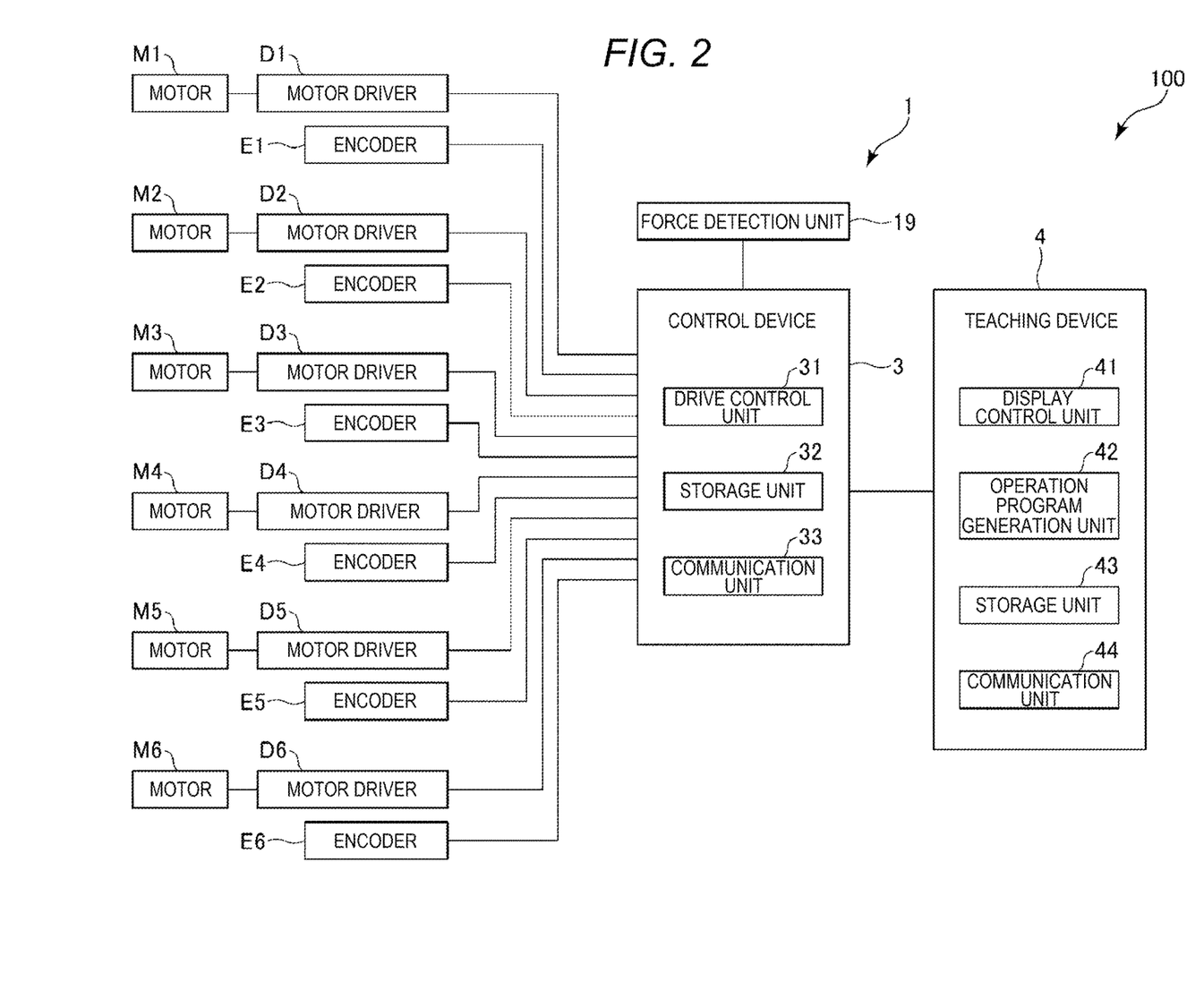
FIG. 2 is a block diagram of the robot system shown in FIG. 1.
Figure 3:
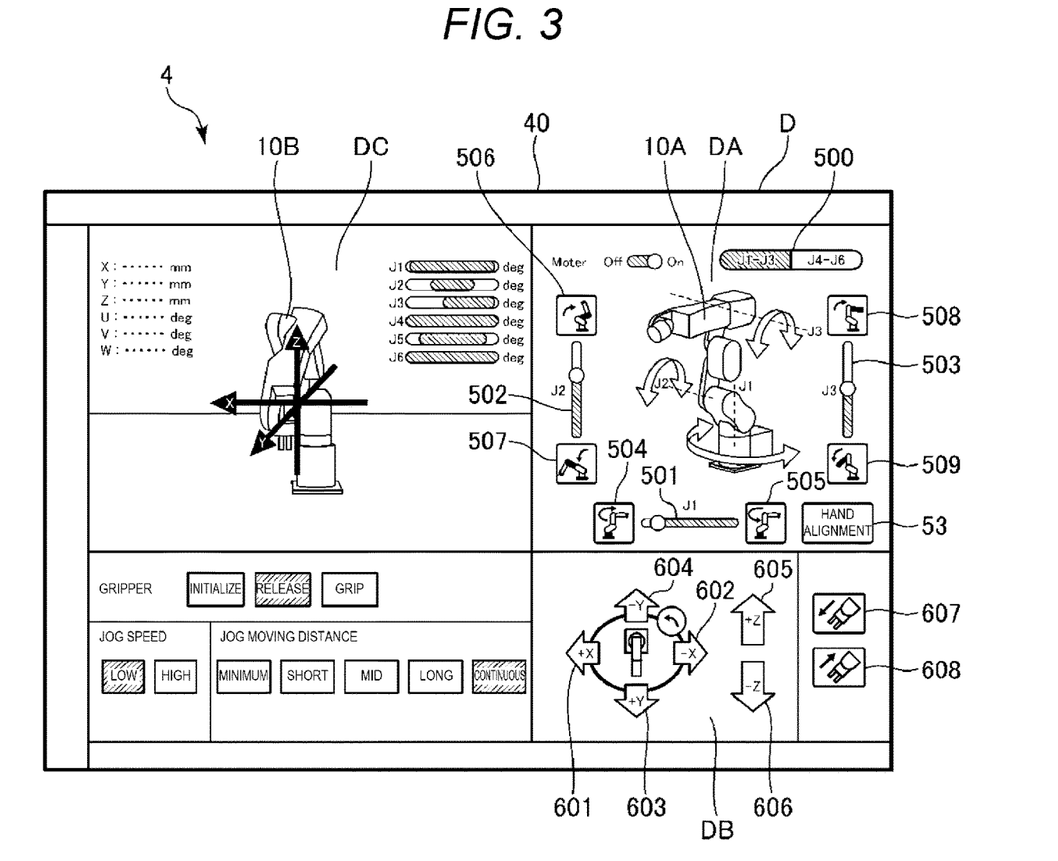
FIG. 3 shows an example of a screen displayed on a display unit of the teaching device shown in FIG. 1.
Figure 4:
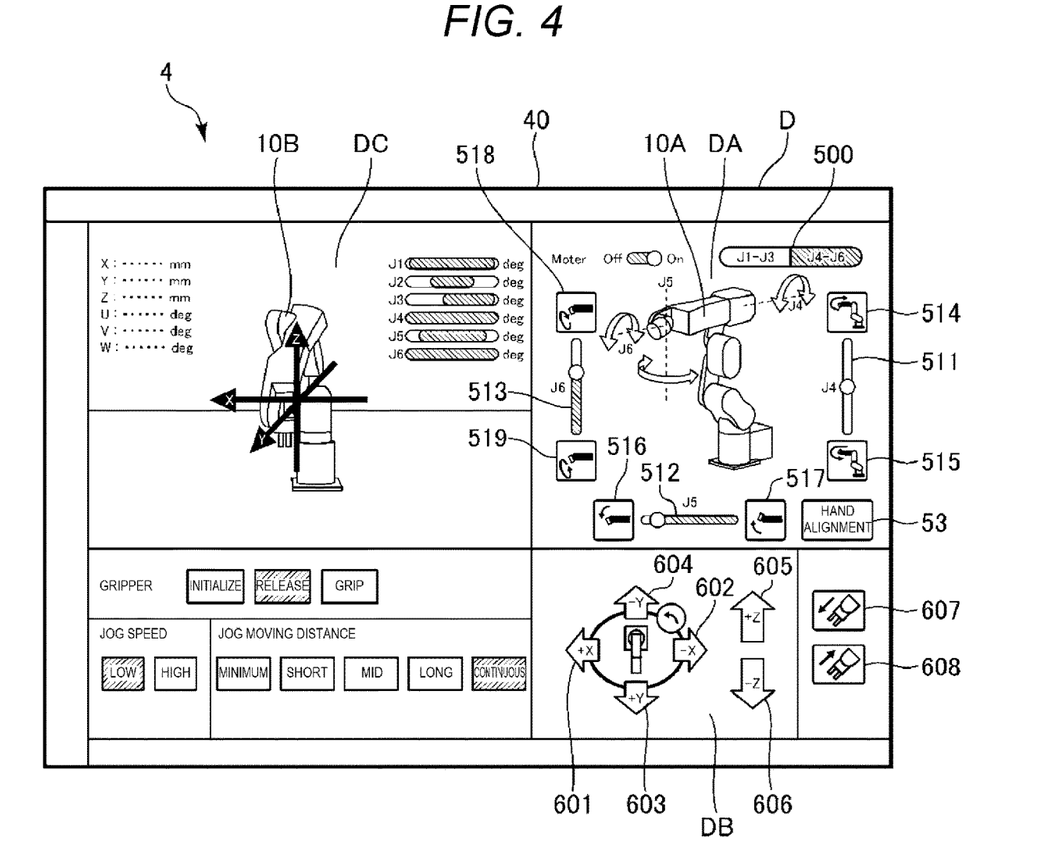
FIG. 4 shows an example of the screen displayed on the display unit of the teaching device shown in FIG. 1.
Figure 5:
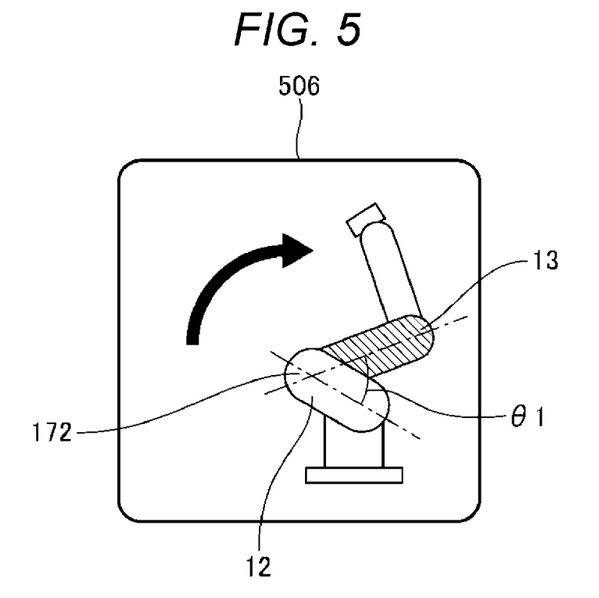
FIG. 5 shows a first icon shown in FIG. 3.
Figure 6:
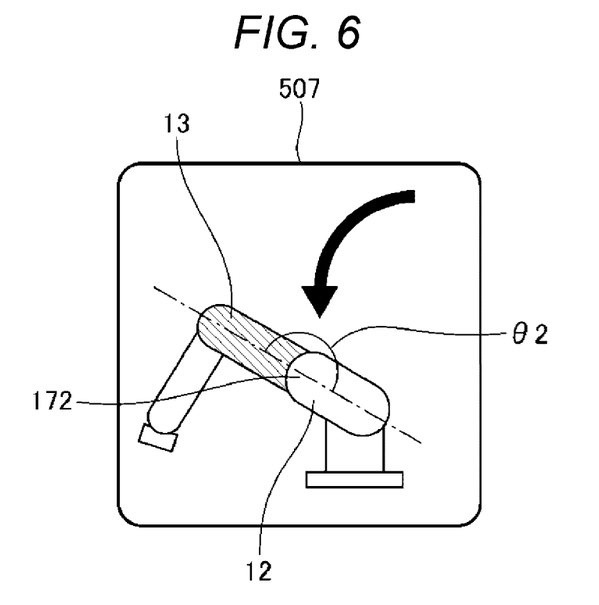
FIG. 6 shows a second icon shown in FIG. 3.
Figure 7:
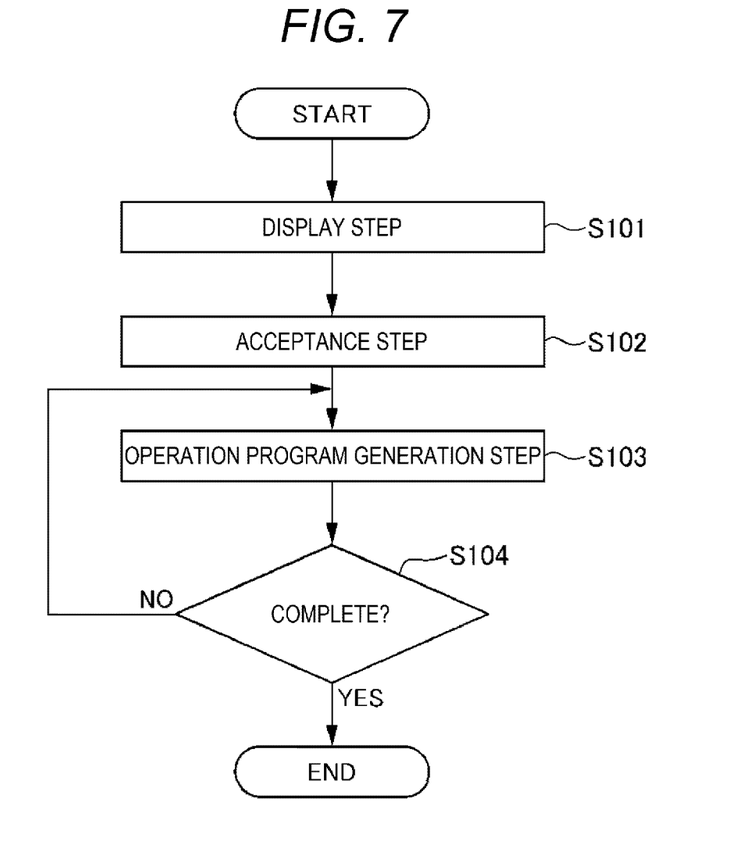
FIG. 7 is a flowchart showing an example of the teaching method according to the present disclosure.

FIG. 1 shows an overall configuration of a robot system having a first embodiment of the teaching device according to the present disclosure. FIG. 2 is a block diagram of the robot system shown in FIG. 1. FIG. 3 shows an example of a screen displayed on a display unit of the teaching device shown in FIG. 1. FIG. 4 shows an example of the screen displayed on the display unit of the teaching device shown in FIG. 1. FIG. 5 shows a first icon shown in FIG. 3. FIG. 6 shows a second icon shown in FIG. 3. FIG. 7 is a flowchart showing an example of the teaching method according to the present disclosure.

The teaching device, the teaching method, and the teaching program according to the present disclosure will now be described in detail, based on preferred embodiments illustrated in the accompanying drawings. In the description below, for the sake of convenience of the description, a +Z-axis direction in FIG. 1, that is, the upper side, is referred to as "up", and a −Z-axis direction, that is, the lower side, is referred to as "down". In a robot arm, a base 11 side in FIG. 1 is referred to as "proximal", and the opposite side thereof, that is, an end effector 20 side, is referred to as "distal". The Z-axis direction in FIG. 1, that is, an up-down direction, is defined as a "vertical direction". An X-axis direction and a Y-axis direction, that is, left-right directions, are defined as a "horizontal direction".

As shown in FIG. 1, a robot system 100 has a robot 1, a control device 3 controlling the robot 1, and a teaching device 4.

First, the robot 1 will be described.

In this embodiment, the robot 1 shown in FIG. 1 is a single-arm 6-axis vertical articulated robot and has a base 11 and a robot arm 10. An end effector 20 can be installed at a distal end part of the robot arm 10. The end effector 20 may or may not be a component of the robot 1.

The robot 1 is not limited to the illustrated configuration and may be a dual-arm multi-joint robot, for example. The robot 1 may also be a horizontal articulated robot.

For a space where the robot 1 exists, a world coordinate system having an origin at an arbitrary position is set. The world coordinate system is a coordinate system prescribed by an X-axis, a Y-axis, and a Z-axis orthogonal to each other.

The base 11 is a support member supporting the robot arm 10 from the lower side in a drivable manner and is fixed on a floor in a plant, for example. In the robot 1, the base 11 is electrically coupled to the control device 3 via a relay cable 18. The coupling between the robot 1 and the control device 3 is not limited to wired coupling as in the configuration shown in FIG. 1 and may be wireless coupling, for example. Also, the robot 1 and the control device 3 may be coupled together via a network such as the internet.

For the base 11, a base coordinate system having an origin at an arbitrary position in the base 11 is set. The base coordinate system is a coordinate system prescribed by an XA-axis, a YA-axis, and a ZA-axis orthogonal to each other. This base coordinate system is made to correspond to the world coordinate system. A position prescribed on the base coordinate system can be prescribed on the world coordinate system.

In this embodiment, the robot arm 10 has an arm 12, an arm 13, an arm 14, an arm 15, an arm 16, and an arm 17. These arms are coupled in this order from the base 11 side. The number of arms provided in the robot arm 10 is not limited to six and may be one, two, three, four, five, or seven or more, for example. The size of each arm such as the total length thereof is not particularly limited and can be suitably set.

The base 11 and the arm 12 are coupled together via a joint 171. The arm 12 is rotationally movable about a first axis of rotational movement J1 parallel to the vertical direction, as the center of rotational movement, in relation to the base 11. The first axis of rotational movement J1 coincides with a normal line to the floor where the base 11 is fixed.

The arm 12 and the arm 13 are coupled together via a joint 172. The arm 13 is rotationally movable about a second axis of rotational movement J2 parallel to the horizontal direction, as the center of rotational movement, in relation to the arm 12. The second axis of rotational movement J2 is parallel to an axis orthogonal to the first axis of rotational movement J1.

The arm 13 and the arm 14 are coupled together via a joint 173. The arm 14 is rotationally movable about a third axis of rotational movement J3 parallel to the horizontal direction, as the center of rotational movement, in relation to the arm 13. The third axis of rotational movement J3 is parallel to the second axis of rotational movement J2.

The arm 14 and the arm 15 are coupled together via a joint 174. The arm 15 is rotationally movable about a fourth axis of rotational movement J4 parallel to the direction of the center axis of the arm 14, as the center of rotational movement, in relation to the arm 14. The fourth axis of rotational movement J4 is orthogonal to the third axis of rotational movement J3.

The arm 15 and the arm 16 are coupled together via a joint 175. The arm 16 is rotationally movable about a fifth axis of rotational movement J5 as the center of rotational movement in relation to the arm 15. The fifth axis of rotational movement J5 is orthogonal to the fourth axis of rotational movement J4.

The arm 16 and the arm 17 are coupled together via a joint 176. The arm 17 is rotationally movable about a sixth axis of rotational movement J6 as the center of rotational movement in relation to the arm 16. The sixth axis of rotational movement J6 is orthogonal to the fifth axis of rotational movement J5.

The arm 17 is a robot distal end part located at the most distal end side of the robot arm 10. The arm 17 can rotationally move along with the end effector 20 when the robot arm 10 is driven.

When the arm 12 is defined as a first arm, the arm 13 is defined as a second arm, the arm 14 is defined as a third arm, the arm 15 is defined as a fourth arm, the arm 16 is defined as a fifth arm, and the arm 17 is defined as a sixth arm, the robot arm 10 has the first arm coupled to the base 11, the second arm coupled to the first arm, the third arm coupled to the second arm, the fourth arm coupled to the third arm, the fifth arm coupled to the fourth arm, and the sixth arm coupled to the fifth arm. The first arm, the second arm, and the third arm belong to a proximal arm 10C. The fourth arm, the fifth arm, and the sixth arm belong to a distal arm 10D. Such a configuration enables switching between a mode for adjusting the angles of rotation of the joints 171 to 173 and a mode for adjusting the angles of rotation of the joints 174 to 176 in a teaching, as described later, and thus can more effectively achieve an advantage described later.

A joint coordinate system is set for each of the joints 171 to 176. Each joint coordinate system is made to correspond to the world coordinate system and the base coordinate system. A position prescribed on each joint coordinate system can be prescribed on the world coordinate system and the base coordinate system.

The robot 1 has a motor M1, a motor M2, a motor M3, a motor M4, a motor M5, and a motor M6, as a drive unit, and an encoder E1, an encoder E2, an encoder E3, an encoder E4, an encoder E5, and an encoder E6. The motor M1 is built in the joint 171 and rotates the base 11 and the arm 12 relatively to each other. The motor M2 is built in the joint 172 and rotates the arm 12 and the arm 13 relatively to each other. The motor M3 is built in the joint 173 and rotates the arm 13 and the arm 14 relatively to each other. The motor M4 is built in the joint 174 and rotates the arm 14 and the arm 15 relatively to each other. The motor M5 is built in the joint 175 and rotates the arm 15 and the arm 16 relatively to each other. The motor M6 is built in the joint 176 and rotates the arm 16 and the arm 17 relatively to each other.

The encoder E1 is built in the joint 171 and detects the position of the motor M1. The encoder E2 is built in the joint 172 and detects the position of the motor M2. The encoder E3 is built in the joint 173 and detects the position of the motor M3. The encoder E4 is built in the joint 174 and detects the position of the motor M4. The encoder E5 is built in the joint 175 and detects the position of the motor M5. The encoder E6 is built in the joint 176 and detects the position of the motor M6.

The encoders E1 to E6 are electrically coupled to the control device 3. The position information about the motors M1 to M6, that is, the amount of rotation, is transmitted as an electrical signal to the control device 3. Based on this information, the control device 3 drives the motors M1 to M6 via motor drivers D1 to D6, not illustrated. That is, controlling the robot arm 10 means controlling the motors M1 to M6.

In the robot 1, a force detection unit 19 detecting a force is removably installed at the robot arm 10. The robot arm 10 can be driven in the state where the force detection unit 19 is installed. In this embodiment, the force detection unit 19 is a 6-axis force sensor. The force detection unit 19 detects the magnitude of a force on three detection axes orthogonal to each other and the magnitude of a torque around the three detection axes. That is, the force detection unit 19 detects force components in X-axis, Y-axis, and Z-axis directions orthogonal to each other, a force component in a W-direction around the X-axis, a force component in a V-direction around the Y-axis, and a force component in a U-direction around the Z-axis. In this embodiment, the Z-axis direction is the vertical direction. The force component in each axial direction can be referred to as a "translational force". The force component around each axis can be referred to as a "torque component". The force detection unit 19 is not limited to a 6-axis force sensor and may have another configuration.

In this embodiment, the force detection unit 19 is installed at the arm 17. However, the site where the force detection unit 19 is installed is not limited to the arm 17, that is, the arm located at the most distal side, and may be another arm or between arms next to each other, for example.

The end effector 20 can be removably installed at the force detection unit 19. In this embodiment, the end effector 20 is formed out of a hand having a pair of claw parts that can move toward and away from each other and gripping and releasing a workpiece with the claw parts. The end effector 20 is not limited to the illustrated configuration and may be a hand gripping a work target object by suction. The end effector 20 may also be a polishing machine, a grinding machine, a cutting machine, or a tool such as a screwdriver or a wrench, for example.

In a robot coordinate system, a tool center point TCP that is a control point is set at the distal end of the end effector 20. In the robot system 100, the position of the tool center point TCP is grasped on the robot coordinate system. Thus, the tool center point TCP can be used as a reference point for control.

For the tool center point TCP, a distal end coordinate system having an origin at an arbitrary position on the tool center point TCP, for example, the distal end, is set. The distal end coordinate system is a coordinate system prescribed by an XB-axis, a YB-axis, and a ZB-axis orthogonal to each other. The distal end coordinate system is made to correspond to the world coordinate system and the base coordinate system. A position prescribed on the distal end coordinate system can be prescribed on the world coordinate system and the base coordinate system.

The control device 3 will now be described.

As shown in FIGS. 1 and 2, in this embodiment, the control device 3 is installed at a position spaced apart from the robot 1. However, the control device 3 is not limited to this configuration and may be built in the base 11. The control device 3 is electrically coupled to each part of the robot 1 having the function of controlling the driving of the robot 1. The control device 3 has a drive control unit 31, a storage unit 32, and a communication unit 33. These units are communicatively coupled to each other via a bus, for example.

The drive control unit 31 is formed out of a processor such as a CPU (central processing unit) or an MPU (micro processing unit), for example, and reads out and executes various programs or the like stored in the storage unit 32. A command signal generated by the drive control unit 31 is transmitted to the robot 1 via the communication unit 33. Thus, the robot arm 10 can execute a predetermined task.

In the storage unit 32, various programs or the like executable by the drive control unit 31 are saved. The storage unit 32 may be a volatile memory such as a RAM (random-access memory), a non-volatile memory such as a ROM (read-only memory), a removable external storage device, or the like, for example. In the storage unit 32, an operation program generated by the teaching device 4 is stored.

The communication unit 33 transmits and receives a signal to and from each part of the robot 1 and the teaching device 4, for example, using an external interface such as a wired LAN (local area network) or a wireless LAN.

The teaching device 4 will now be described.

As shown in FIGS. 1 and 2, the teaching device 4 has a function of preparing and inputting an operation program to the robot arm 10. The teaching device 4 has a display unit 40, a display control unit 41, an operation program generation unit 42, a storage unit 43, and a communication unit 44. The teaching device 4 is not particularly limited and may be a tablet, a personal computer, a smartphone, a teach pendant, or the like, for example.

The display unit 40 is formed out of a liquid crystal screen and displays a teaching screen, described later, for example. In this embodiment, the display unit 40 is formed out of a touch panel and also functions as an input unit. However, this configuration is not limiting. For example, an input device such as a keyboard or a mouse that is separate from the display unit 40 may be used to perform various operations.

The display control unit 41 is formed out of a CPU (central processing unit), for example, and reads out and executes a display program, which is a part of the teaching program according to the present disclosure stored in the storage unit 43. That is, the display control unit 41 controls an electrification condition for the display unit 40 and thus causes the display unit 40 to display a desired screen.

The operation program generation unit 42 is formed out of a CPU (central processing unit), for example, and reads out and executes an operation generation program, which is a part of the teaching program according to the present disclosure stored in the storage unit 43. Thus, an operation program to be executed by the robot 1 can be generated and a teaching can be given, as described later. The teaching refers to generating an operation program and storing the generated operation program in the storage unit 32 of the control device 3 or the storage unit 43 of the teaching device 4.

In the storage unit 43, various programs or the like executable by the display control unit 41 and the operation program generation unit 42 are saved. The storage unit 43 may be a volatile memory such as a RAM (random-access memory), a non-volatile memory such as a ROM (read-only memory), a removable external storage device, or the like, for example.

The communication unit 44 transmits and receives a signal to and from control device 3, for example, using an external interface such as a wired LAN (local area network) or a wireless LAN.

The configuration of the robot system 100 has been briefly described above. A display screen D displayed on the display unit 40 when giving a teaching will now be described.

The display screen D is a screen displayed on the display unit 40 when giving a teaching. The teaching refers to generating an operation program and storing the operation program in the storage unit 43 of the teaching device 4 or the storage unit 32 of the control device 3. The teaching includes a direct teaching in which the worker successively stores the attitude of the robot arm 10 while directly applying a force to the robot arm 10 to change the attitude of the robot arm 10, and an indirect teaching in which the worker operates the teaching device 4 to designate an attitude of the robot arm 10 and store the attitude. Of these teachings, the present disclosure relates to the indirect teaching. Storing the attitude refers to storing the angles of rotation of the joints 171 to 176.

As shown in FIGS. 3 and 4, the display screen D has a first display area DA, a second display area DB, and a third display area DC. The first display area DA and the second display area DB are located on the right side in the display screen D. The third display area DC is located on the left side in the display screen D. The first display area DA and the second display area DB are arranged in this order from the top.

In the first display area DA, a switching button 500 is displayed. Pressing the switching button 500 can make a switch between the state shown in FIG. 3 and the state shown in FIG. 4.

In the state shown in FIG. 3, a virtual robot 10A, a first operation unit 501, a first operation unit 502, a first operation unit 503, a first icon 504, a second icon 505, a first icon 506, a second icon 507, a first icon 508, and a second icon 509 are displayed in the first display area DA.

The virtual robot 10A is located substantially at a center part of the first display area DA and shows what position each axis of rotation is located at in the virtual robot 10A. The first operation unit 501, the first icon 504, and the second icon 505 are displayed below the virtual robot 10A. In this embodiment, the first operation unit 501 is formed out of a slider bar extending in the left-right direction in FIG. 3 and is configured to perform an operation of designating the angle of rotation of the joint 171. The first operation unit 501 is operated in such a way that a round knob is moved to the left or right while in a pressed state, thus enabling adjustment of the angle of rotation of the arm 12 about the first axis of rotational movement J1 so as to change the attitude of the robot arm 10.

The first icon 504 is displayed to the left of the first operation unit 501. The second icon 505 is displayed to the right of the first operation unit 501. The first icon 504 shows a picture schematically illustrating the robot arm 10 and shows a part equivalent to the arm 12 in a different color from the color of the periphery. The first icon 504 shows an attitude of the robot arm 10 where the joint 171 is rotated in the direction of the arrow in the first icon 504.

In the state where the round knob of the first operation unit 501 is located at the leftmost side in the left-right direction, the robot arm 10 is in an attitude where the joint 171 is rotated to the maximum in the direction of the arrow in the first icon 504. Meanwhile, in the state where the round knob of the first operation unit 501 is located at the rightmost side in the left-right direction, the robot arm 10 is in an attitude where the joint 171 is rotated to the maximum in the direction of the arrow in the second icon 505.

In the state where the round knob of the first operation unit 501 is located at an intermediate position in the left-right direction, the position of the round knob in the left-right direction corresponds to the position in the direction of rotation of the joint 171. Therefore, the degree to which the arm 12 is to be rotated is easy to understand. Also, in the first operation unit 501, the round knob can be continuously moved by sliding. Therefore, the angle of rotation of the joint 171 can be continuously changed and an appropriate angle of rotation can be selected during the change.

The first operation unit 502, the first icon 506, and the second icon 507 are displayed to the left of the virtual robot 10A. In this embodiment, the first operation unit 502 is formed out of a slider bar extending in the up-down direction in FIG. 3 and is configured to perform an operation of designating the angle of rotation of the joint 172. The first operation unit 502 is operated in such a way that a round knob is moved up and down while in a pressed state, thus enabling adjustment of the angle of rotation of the arm 13 about the second axis of rotational movement J2 so as to change the attitude of the robot arm 10.

The first icon 506 is displayed above the first operation unit 502. The second icon 507 is displayed below the first operation unit 502. The first icon 506 shows a picture schematically illustrating the robot arm 10 and shows a part equivalent to the arm 13 in a different color from the color of the periphery. The first icon 506 shows an attitude of the robot arm 10 where the joint 172 is rotated in the direction of the arrow in the first icon 506.

In the state where the round knob of the first operation unit 502 is located at the uppermost side in the up-down direction, the robot arm 10 is in an attitude where the joint 172 is rotated to the maximum in the direction of the arrow in the first icon 506. Meanwhile, in the state where the round knob of the first operation unit 502 is located at the lowermost side in the up-down direction, the robot arm 10 is in an attitude where the joint 172 is rotated to the maximum in the direction of the arrow in the second icon 507.

In the state where the round knob of the first operation unit 502 is located at an intermediate position in the up-down direction, the position of the round knob in the up-down direction corresponds to the position in the direction of rotation of the joint 172. Therefore, the degree to which the arm 13 is to be rotated is easy to understand. Also, in the first operation unit 502, the round knob can be continuously moved by sliding. Therefore, the angle of rotation of the joint 172 can be continuously changed and an appropriate angle of rotation can be selected during the change.

The first operation unit 503, the first icon 508, and the second icon 509 are displayed to the right of the virtual robot 10A. In this embodiment, the first operation unit 503 is formed out of a slider bar extending in the up-down direction in FIG. 3 and is configured to perform an operation of designating the angle of rotation of the joint 173. The first operation unit 503 is operated in such a way that a round knob is moved up and down while in a pressed state, thus enabling adjustment of the angle of rotation of the arm 14 about the third axis of rotational movement J3 so as to change the attitude of the robot arm 10.

The first icon 508 is displayed above the first operation unit 503. The second icon 509 is displayed below the first operation unit 503. The first icon 508 shows a picture schematically illustrating the robot arm 10 and shows a part equivalent to the arm 14 in a different color from the color of the periphery. The first icon 508 shows an attitude of the robot arm 10 where the joint 173 is rotated in the direction of the arrow in the first icon 508.

In the state where the round knob of the first operation unit 503 is located at the uppermost side in the up-down direction, the robot arm 10 is in an attitude where the joint 173 is rotated to the maximum in the direction of the arrow in the first icon 508. Meanwhile, in the state where the round knob of the first operation unit 503 is located at the lowermost side in the up-down direction, the robot arm 10 is in an attitude where the joint 173 is rotated to the maximum in the direction of the arrow in the second icon 509.

In the state where the round knob of the first operation unit 503 is located at an intermediate position in the up-down direction, the position of the round knob in the up-down direction corresponds to the position in the direction of rotation of the joint 173. Therefore, the degree to which the arm 14 is to be rotated is easy to understand. Also, in the first operation unit 503, the round knob can be continuously moved by sliding. Therefore, the angle of rotation of the joint 173 can be continuously changed and an appropriate angle of rotation can be selected during the change.

The state switched as shown in FIG. 4 will now be described. In the state shown in FIG. 4, the virtual robot 10A, a first operation unit 511, a first operation unit 512, a first operation unit 513, a first icon 514, a second icon 515, a first icon 516, a second icon 517, a first icon 518, and a second icon 519 are displayed in the first display area DA.

The first operation unit 511, the first icon 514, and the second icon 515 are displayed to the right of the virtual robot 10A. In this embodiment, the first operation unit 511 is formed out of a slider bar extending in the up-down direction in FIG. 4 and is configured to perform an operation of designating the angle of rotation of the joint 174. The first operation unit 511 is operated in such a way that a round knob is moved up and down while in a pressed state, thus enabling adjustment of the angle of rotation of the arm 15 about the fourth axis of rotational movement J4 so as to change the attitude of the robot arm 10.

The first icon 514 is displayed above the first operation unit 511. The second icon 515 is displayed below the first operation unit 511. The first icon 514 shows a picture schematically illustrating the robot arm 10 and shows a part equivalent to the arm 15 in a different color from the color of the periphery. The first icon 514 shows an attitude of the robot arm 10 where the joint 174 is rotated in the direction of the arrow in the first icon 514.

In the state where the round knob of the first operation unit 511 is located at the uppermost side in the up-down direction, the robot arm 10 is in an attitude where the joint 174 is rotated to the maximum in the direction of the arrow in the first icon 514. Meanwhile, in the state where the round knob of the first operation unit 511 is located at the lowermost side in the up-down direction, the robot arm 10 is in an attitude where the joint 174 is rotated to the maximum in the direction of the arrow in the second icon 515.

In the state where the round knob of the first operation unit 511 is located at an intermediate position in the up-down direction, the position of the round knob in the up-down direction corresponds to the position in the direction of rotation of the joint 174. Therefore, the degree to which the arm 15 is to be rotated is easy to understand. Also, in the first operation unit 511, the round knob can be continuously moved by sliding. Therefore, the angle of rotation of the joint 174 can be continuously changed and an appropriate angle of rotation can be selected during the change.

The first operation unit 512, the first icon 516, and the second icon 517 are displayed below the virtual robot 10A. In this embodiment, the first operation unit 512 is formed out of a slider bar extending in the left-right direction in FIG. 4 and is configured to perform an operation of designating the angle of rotation of the joint 175. The first operation unit 512 is operated in such a way that a round knob is moved to the left and right while in a pressed state, thus enabling adjustment of the angle of rotation of the arm 16 about the fifth axis of rotational movement J5 so as to change the attitude of the robot arm 10.

The first icon 516 is displayed to the left of the first operation unit 512. The second icon 517 is displayed to the right of the first operation unit 512. The first icon 516 shows a picture schematically illustrating the robot arm 10 and shows a part equivalent to the arm 16 in a different color from the color of the periphery. The first icon 516 shows an attitude of the robot arm 10 where the joint 175 is rotated in the direction of the arrow in the first icon 516.

In the state where the round knob of the first operation unit 512 is located at the leftmost side in the left-right direction, the robot arm 10 is in an attitude where the joint 175 is rotated to the maximum in the direction of the arrow in the first icon 516. Meanwhile, in the state where the round knob of the first operation unit 512 is located at the rightmost side in the left-right direction, the robot arm 10 is in an attitude where the joint 175 is rotated to the maximum in the direction of the arrow in the second icon 517.

In the state where the round knob of the first operation unit 512 is located at an intermediate position in the left-right direction, the position of the round knob in the left-right direction corresponds to the position in the direction of rotation of the joint 175. Therefore, the degree to which the arm 16 is to be rotated is easy to understand. Also, in the first operation unit 512, the round knob can be continuously moved by sliding. Therefore, the angle of rotation of the joint 175 can be continuously changed and an appropriate angle of rotation can be selected during the change.

The first operation unit 513, the first icon 518, and the second icon 519 are displayed to the left of the virtual robot 10A. In this embodiment, the first operation unit 513 is formed out of a slider bar extending in the up-down direction in FIG. 4 and is configured to perform an operation of designating the angle of rotation of the joint 176. The first operation unit 513 is operated in such a way that a round knob is moved up and down while in a pressed state, thus enabling adjustment of the angle of rotation of the arm 17 about the sixth axis of rotational movement J6 so as to change the attitude of the robot arm 10.

The first icon 518 is displayed above the first operation unit 513. The second icon 519 is displayed below the first operation unit 513. The first icon 518 shows a picture schematically illustrating the robot arm 10 and shows a part equivalent to the arm 17 in a different color from the color of the periphery. The first icon 518 shows an attitude of the robot arm 10 where the joint 176 is rotated in the direction of the arrow in the first icon 518.

In the state where the round knob of the first operation unit 513 is located at the uppermost side in the up-down direction, the robot arm 10 is in an attitude where the joint 176 is rotated to the maximum in the direction of the arrow in the first icon 518. Meanwhile, in the state where the round knob of the first operation unit 513 is located at the lowermost side in the up-down direction, the robot arm 10 is in an attitude where the joint 176 is rotated to the maximum in the direction of the arrow in the second icon 519.

In the state where the round knob of the first operation unit 513 is located at an intermediate position in the up-down direction, the position of the round knob in the up-down direction corresponds to the position in the direction of rotation of the joint 176. Therefore, the degree to which the arm 17 is to be rotated is easy to understand. Also, in the first operation unit 513, the round knob can be continuously moved by sliding. Therefore, the angle of rotation of the joint 176 can be continuously changed and an appropriate angle of rotation can be selected during the change.

By using such a first display area DA and operating the first operation unit 501, the first operation unit 502, the first operation unit 503, the first operation unit 511, the first operation unit 512, and the first operation unit 513 to set the robot arm 10 in a desired attitude, and then pressing a teaching button, not illustrated, the worker can store the attitude in the storage unit 43. Also, by making such an adjustment of the attitude a desired number of times, the worker can give a teaching while storing a work start attitude, an intermediate attitude, and a work end attitude or the like of the robot arm 10, for example.

When the first operation unit 501, the first operation unit 502, the first operation unit 503, the first operation unit 511, the first operation unit 512, and the first operation unit 513 are operated, a virtual robot 10B in the third display area DC changes attitude, based on information inputted from each operation unit. The virtual robot 10B is a three-dimensional simulation image of the robot arm 10. In the third display area DC, the three axes prescribed in the world coordinate system are displayed.

In this way, the display unit 40 has the third display area DC, which is a virtual robot display unit displaying the virtual robot 10B. In the third display area DC, the virtual robot 10B having the attitude linked to the operation of the first operation unit 501, the first operation unit 502, the first operation unit 503, the first operation unit 511, the first operation unit 512, and the first operation unit 513 is displayed. Thus, the worker can give a teaching while checking the virtual robot 10B.

When the virtual robot 10B changes attitude, the robot arm 10 may change attitude, linked to the virtual robot 10B. Alternatively, the robot arm 10 may be not linked to the virtual robot 10B.

In this way, when attention is directed to the joint 172, as shown in FIGS. 5 and 6, the proximal arm 10C has the joint 172, and the display unit 40 also displays the first icon 506 showing a first attitude of the robot arm 10, which is a state where the angle of the joint 172 is a first angle 81, and the second icon 507 showing a second attitude of the robot arm 10, which is a state where the angle of the joint 172 is a second angle 82 that is different from the first angle 81. The first operation unit 502 is configured to perform an operation of designating a third attitude of the robot arm 10, which is a state where the angle of the joint 172 is a third angle 83 equal to or greater than the first angle 81 and equal to or smaller than the second angle 82. Therefore, the worker can give a teaching while grasping which direction to operate the first operation unit 502 in, so as to change the robot arm 10 into what attitude. Thus, the teaching device 4 enables accurate and easy teaching.

In the above description, attention is directed to the joint 172, the first operation unit 502, the first icon 506, and the second icon 507. However, similar effects can be achieved with respect to the joint 171, the joint 173, the joint 174, the joint 175, and the joint 176, and the corresponding operation units and icons. This also applies to the description below.

The first operation unit 501, the first operation unit 502, the first operation unit 503, the first operation unit 511, the first operation unit 512, and the first operation unit 513 have a slider bar that can continuously change the third angle θ3.

Thus, a fine adjustment of the attitude can be made and an accurate teaching can be given. The term "continuous" in this specification refers to a movement by a predetermined angle each that is small enough to make the robot arm 10 look like continuously moving (for example, by 0.1° each).

When attention is directed to the joint 172, as shown in FIGS. 5 and 6, the rotating arm 13, of the arm 12 and the arm 13 coupled together via the joint 172, is displayed differently in the first icon 506 and the second icon 507. This enables the worker to immediately grasp which arm is to be rotated, when changing the attitude of the robot arm 10.

In the first icon 506 and the second icon 507, an arrow is displayed as an indicator showing the direction in which the rotating arm moves. This enables the worker to immediately grasp which arm is to be rotated, when changing the attitude of the robot arm 10, that is, when operating the slider bar.

The first angle 61 is an angle representing a movement range limit of the joint 172 or an angle within 20° from the movement range limit. The second angle 62 is an angle representing the movement range limit of the joint 172 or an angle within 20° from the movement range limit. Thus, a teaching can be given, using substantially the entire movement range.

In this way, the first display area DA enables the worker to adjust the attitude of the robot arm 10 and give a teaching with the robot arm 10 in a desired attitude. Such an adjustment of the attitude in the first display area DA uses the joint coordinate system set for each joint. Therefore, when wishing to largely change the attitude and give a teaching, the worker gives a teaching, using the first display area DA.

Particularly, as shown in FIG. 3, a switch between the mode for adjusting the angles of rotation of the joints 171 to 173 and the mode for adjusting the angles of rotation of the joints 174 to 176 can be made. That is, the display unit 40 has the switching button 500 for switching between a mode for performing an operation of designating the proximal arm 10C to change the attitude of the robot arm 10 and a mode for performing an operation of designating the distal arm 10D to change the attitude of the robot arm 10. Adjusting the angles of rotation of the joints 171 to 173 can change the attitude of the robot arm 10 relatively largely. Adjusting the angles of rotation of the joints 174 to 176 can change the attitude of the robot arm 10 in a relatively small way. Therefore, by giving a teaching while suitably switching between such modes, the worker can change the attitude of the robot arm 10 more swiftly. Thus, excellent convenience and more swift teaching can be achieved.

In the first display area DA, a hand alignment button 53 is displayed. Pressing the hand alignment button 53 can adjust the attitude of the robot arm 10 without changing the position of the tool center point TCP in such a way that the Z-axis in the distal end coordinate system set for the tool center point TCP is aligned with the Z-axis in the world coordinate system.

The first display area DA has been described above. The second display area DB will now be described. As shown in FIGS. 3 and 4, a second operation unit 601, a second operation unit 602, a second operation unit 603, a second operation unit 604, a second operation unit 605, a second operation unit 606, a hand operation unit 607, and a hand operation unit 608 are displayed in the second display area DB.

The second operation unit 601 is a button on which "+X" is displayed. Pressing a part corresponding to the second operation unit 601 can change the attitude of the robot arm 10 in such a way that the tool center point TCP moves to the +X side in the world coordinate system.

The second operation unit 602 is a button on which "−X" is displayed. Pressing a part corresponding to the second operation unit 602 can change the attitude of the robot arm 10 in such a way that the tool center point TCP moves to the −X side in the world coordinate system.

The second operation unit 603 is a button on which "+Y" is displayed. Pressing a part corresponding to the second operation unit 603 can change the attitude of the robot arm 10 in such a way that the tool center point TCP moves to the +Y side in the world coordinate system.

The second operation unit 604 is a button on which "−Y" is displayed. Pressing a part corresponding to the second operation unit 604 can change the attitude of the robot arm 10 in such a way that the tool center point TCP moves to the −Y side in the world coordinate system.

The second operation unit 605 is a button on which "+Z" is displayed. Pressing a part corresponding to the second operation unit 605 can change the attitude of the robot arm 10 in such a way that the tool center point TCP moves to the +Z side in the world coordinate system.

The second operation unit 606 is a button on which "−Z" is displayed. Pressing a part corresponding to the second operation unit 606 can change the attitude of the robot arm 10 in such a way that the tool center point TCP moves to the −Z side in the world coordinate system.

The hand operation unit 607 is a button on which a schematic view of the end effector 20 is displayed. Pressing a part corresponding to the hand operation unit 607 can change the attitude of the robot arm 10 in such a way that the end effector 20 moves straight ahead in the direction in which the end effector 20 faces.

The hand operation unit 608 is a button on which a schematic view of the end effector 20 is displayed. Pressing a part corresponding to the hand operation unit 608 can change the attitude of the robot arm 10 in such a way that the end effector 20 moves straight to the side opposite to the direction in which the end effector 20 faces.

In this way, the second operation units 601 to 606 for performing an operation of designating the position of the tool center point TCP as a control point set for the robot arm 10 and then changing the attitude of the robot arm 10 are displayed in the second display area DB. Thus, the attitude of the robot arm 10 can be changed more finely and a more accurate teaching can be given.

As described above, the teaching device 4 is a teaching device generating an operation program for executing an operation of the robot 1 having the base 11 and the robot arm 10 including the proximal arm 10C coupled to the base 11 and the distal arm 10D coupled to the side opposite to the base 11 of the proximal arm 100. The teaching device 4 includes: the display unit 40 displaying the first operation unit 501, the first operation unit 502, the first operation unit 503, the first operation unit 511, the first operation unit 512, and the first operation unit 513 for performing an operation of designating the proximal arm 10C of the robot arm 10 and changing the attitude of the robot arm 10, and the second operation unit 601, the second operation unit 602, the second operation unit 603, the second operation unit 604, the second operation unit 605, and the second operation unit 606 for performing an operation of designating the position of the tool center point TCP as a control point set for the robot arm 10 and changing the attitude of the robot arm 10; and the operation program generation unit 42 generating an operation program, based on the attitude designated at the first operation unit 501, the first operation unit 502, the first operation unit 503, the first operation unit 511, the first operation unit 512, and the first operation unit 513, or the second operation unit 601, the second operation unit 602, the second operation unit 603, the second operation unit 604, the second operation unit 605, and the second operation unit 606. As the first operation unit 501, the first operation unit 502, the first operation unit 503, the first operation unit 511, the first operation unit 512, and the first operation unit 513 for changing the attitude relatively largely, and the second operation unit 601, the second operation unit 602, the second operation unit 603, the second operation unit 604, the second operation unit 605, and the second operation unit 606 for changing the attitude relatively finely are displayed in this way, the worker can select an optimal operation unit and give a teaching according to the attitude which the robot arm 10 is to be changed into. Thus, the attitude of the robot arm 10 can be changed more accurately and swiftly. Also, the attitude may be changed relatively largely and subsequently finely adjusted, for example.

The first operation unit 501, the first operation unit 502, the first operation unit 503, the first operation unit 511, the first operation unit 512, and the first operation unit 513 are configured to perform an operation of changing the attitude of the robot arm 10 in the joint coordinate system set for the joints of the robot arm 10. The second operation unit 601, the second operation unit 602, the second operation unit 603, the second operation unit 604, the second operation unit 605, and the second operation unit 606 are configured to perform an operation of changing the attitude of the robot arm 10 in the world coordinate system set for the space where the robot 1 exists. Since a desired coordinate system can be selected from among different coordinate systems so as to change the attitude in this way, excellent convenience is achieved. The second operation unit 601, the second operation unit 602, the second operation unit 603, the second operation unit 604, the second operation unit 605, and the second operation unit 606 are not limited to the above configuration and may be configured to perform an operation of changing the attitude of the robot arm 10 in the distal end coordinate system, or may be configured to perform an operation of changing the attitude of the robot arm 10 in the base coordinate system, or may be configured to perform an operation of changing the attitude of the robot arm 10 in an object coordinate system set for the workpiece.

The display unit 40 displays the first operation unit 501, the first operation unit 502, the first operation unit 503, the first operation unit 511, the first operation unit 512, and the first operation unit 513, and the second operation unit 601, the second operation unit 602, the second operation unit 603, the second operation unit 604, the second operation unit 605, and the second operation unit 606, as arranged along one direction, that is, as arranged at the top and bottom in the illustrated configuration. Thus, options about which operation unit to operate on one screen are increased and convenience can be enhanced. Also, since the screen is simple as shown in the illustration, even a beginner finds it easy to understand.

The teaching method according to the present disclosure will now be described with reference to the flowchart shown in FIG. 7.

First, in step S101, the display screen D shown in FIG. 3 or FIG. 4 is displayed. The worker operates the first operation unit 501, the first operation unit 502, the first operation unit 503, the first operation unit 511, the first operation unit 512, and the first operation unit 513, or the second operation unit 601, the second operation unit 602, the second operation unit 603, the second operation unit 604, the second operation unit 605, and the second operation unit 606 so that the robot arm 10 changes into a desired attitude.

Next, in step S102, information about an operation performed on the display screen D is accepted. That is, information about a designated attitude of the robot arm 10 is acquired.

As described above, the teaching device 4 enables the worker to operate the first operation unit 501, the first operation unit 502, the first operation unit 503, the first operation unit 511, the first operation unit 512, and the first operation unit 513 while viewing the first icon and the second icon when operating the display screen D, and therefore enables the worker to give a teaching while grasping which direction to operate the first operation unit 501 in, so as to change the robot arm 10 into what attitude. Thus, the teaching device 4 enables accurate and easy teaching.

On the display screen D, the first operation unit 501, the first operation unit 502, the first operation unit 503, the first operation unit 511, the first operation unit 512, the first operation unit 513, and the second operation unit 601, the second operation unit 602, the second operation unit 603, the second operation unit 604, the second operation unit 605, the second operation unit 606 as described above are displayed. Therefore, the worker can select an optimal operation unit and give a teaching according to the attitude which the robot arm 10 is to be changed into. Thus, the attitude of the robot arm 10 can be changed more accurately and swiftly. Also, the attitude can be changed relatively largely and subsequently finely adjusted, for example.

Next, in step S103, an operation program is generated. That is, an operation program is generated, based on the information about the attitude of the robot arm 10 accepted in step S102. That is, a program for driving the robot arm 10 in such a way that the robot arm 10 changes into attitudes designated by the worker in an arbitrary order is prepared.

Next, in step S104, whether the generation of the operation program is complete or not is determined. The determination in this step is made, based on whether a complete button, not illustrated, is pressed or not. When it is determined in step S104 that the generation of the operation program is not complete, the processing returns to step S103 and the subsequent steps are repeated.

In this way, the teaching method according to the present disclosure includes: the display step of displaying the first operation unit 501, the first operation unit 502, the first operation unit 503, the first operation unit 511, the first operation unit 512, and the first operation unit 513 for performing an operation of designating the proximal arm 10C of the robot arm 10 and changing the attitude of the robot arm 10, and the second operation unit 601, the second operation unit 602, the second operation unit 603, the second operation unit 604, the second operation unit 605, and the second operation unit 606 for performing an operation of designating the position of the tool center point TCP as a control point set for the robot arm 10 and changing the attitude of the robot arm 10; and the operation program generation step of generating an operation program for executing an operation of the robot 1 having the robot arm 10, based on the attitude designated at the first operation unit 501, the first operation unit 502, the first operation unit 503, the first operation unit 511, the first operation unit 512, and the first operation unit 513, or the second operation unit 601, the second operation unit 602, the second operation unit 603, the second operation unit 604, the second operation unit 605, and the second operation unit 606. As the first operation unit 501, the first operation unit 502, the first operation unit 503, the first operation unit 511, the first operation unit 512, and the first operation unit 513 for changing the attitude relatively largely, and the second operation unit 601, the second operation unit 602, the second operation unit 603, the second operation unit 604, the second operation unit 605, and the second operation unit 606 for changing the attitude relatively finely are displayed in this way, the worker can select an optimal operation unit and give a teaching according to the attitude which the robot arm 10 is to be changed into. Thus, the attitude of the robot arm 10 can be changed more accurately and swiftly. Also, the attitude may be changed relatively largely and subsequently finely adjusted, for example.

Also, the teaching program according to the present disclosure is configured to execute: the display step of displaying the first operation unit 501, the first operation unit 502, the first operation unit 503, the first operation unit 511, the first operation unit 512, and the first operation unit 513 for performing an operation of designating the proximal arm 10C of the robot arm 10 and changing the attitude of the robot arm 10, and the second operation unit 601, the second operation unit 602, the second operation unit 603, the second operation unit 604, the second operation unit 605, and the second operation unit 606 for performing an operation of designating the position of the tool center point TCP as a control point set for the robot arm 10 and changing the attitude of the robot arm 10; and the operation program generation step of generating an operation program for executing an operation of the robot 1 having the robot arm 10, based on the attitude designated at the first operation unit 501, the first operation unit 502, the first operation unit 503, the first operation unit 511, the first operation unit 512, and the first operation unit 513, or the second operation unit 601, the second operation unit 602, the second operation unit 603, the second operation unit 604, the second operation unit 605, and the second operation unit 606. As the first operation unit 501, the first operation unit 502, the first operation unit 503, the first operation unit 511, the first operation unit 512, and the first operation unit 513 for changing the attitude relatively largely, and the second operation unit 601, the second operation unit 602, the second operation unit 603, the second operation unit 604, the second operation unit 605, and the second operation unit 606 for changing the attitude relatively finely are displayed in this way, the worker can select an optimal operation unit and give a teaching according to the attitude which the robot arm 10 is to be changed into. Thus, the attitude of the robot arm 10 can be changed more accurately and swiftly. Also, the attitude may be changed relatively largely and subsequently finely adjusted, for example.

The teaching program according to the present disclosure may be stored in the storage unit 43 or may be stored in a recording medium such as a CD-ROM, for example, or may be stored in a storage device that can be coupled via a network or the like.

Second Embodiment

Figure 8:
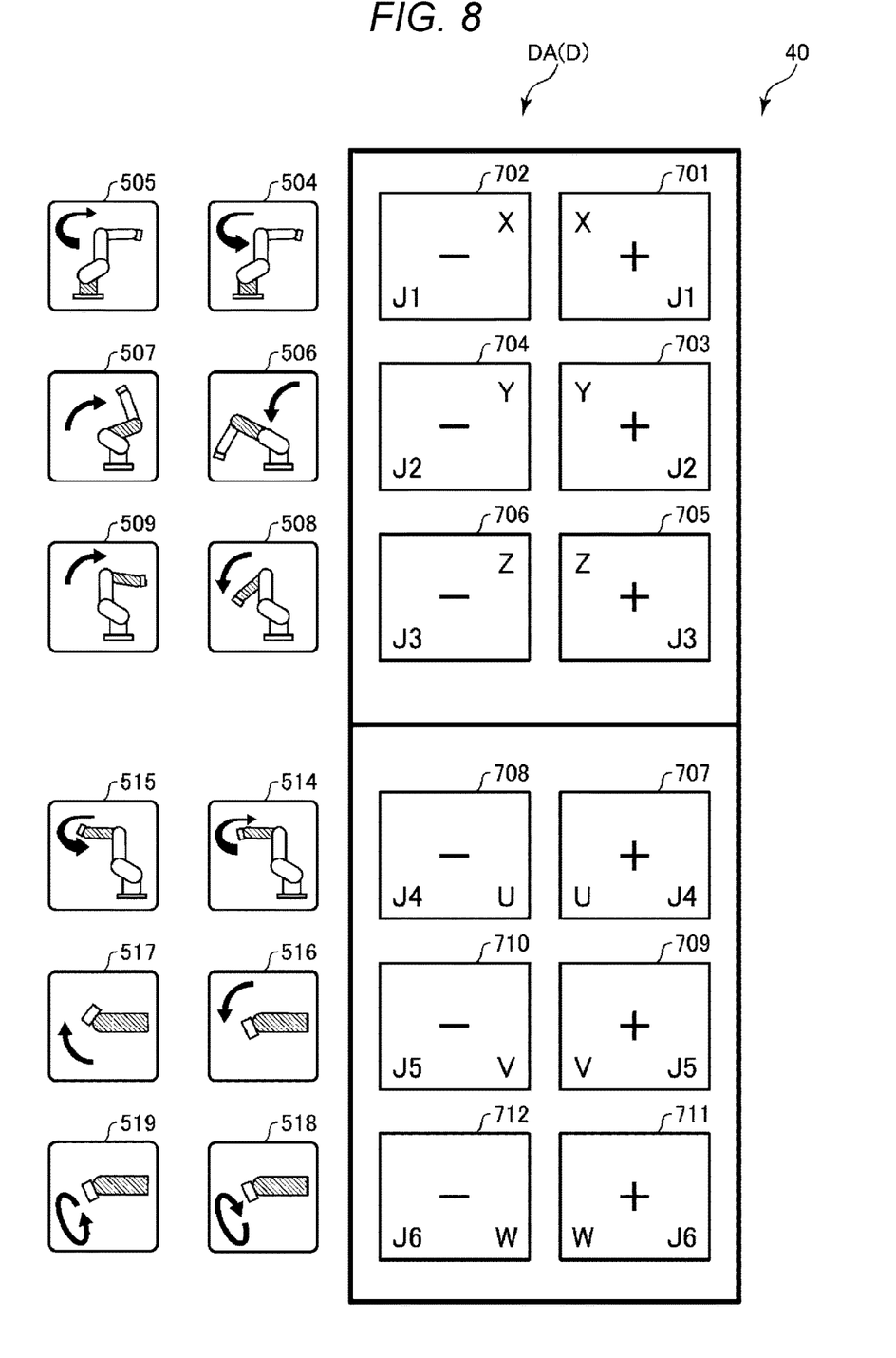
FIG. 8 shows a first operation unit, a first icon, and a second icon displayed on a display unit provided in a second embodiment of the teaching device according to the present disclosure.

FIG. 8 shows a first operation unit, a first icon, and a second icon displayed on a display unit provided in a second embodiment of the teaching device according to the present disclosure.

The second embodiment will now be described. In the description below, the difference from the first embodiment is mainly described and the description of similar matters is omitted.

In this embodiment, as shown in FIG. 8, a first operation unit 701, a first operation unit 702, a first operation unit 703, a first operation unit 704, a first operation unit 705, a first operation unit 706, a first operation unit 707, a first operation unit 708, a first operation unit 709, a first operation unit 710, a first operation unit 711, and a first operation unit 712 are displayed in the first display area DA. In this embodiment, the first operation units 701 to 712 are formed out of buttons to press corresponding parts.

The first operation unit 701, the first operation unit 702, the first icon 504, and the second icon 505 are displayed, arrayed in this order from the right.

A sign "+" is displayed on the first operation unit 701. Pressing a part corresponding to the first operation unit 701 can change the angle of rotation of the joint 171 stepwise (for example, by 5° each) in the direction of the arrow in the first icon 504.

A sign "−" is displayed on the first operation unit 702. Pressing a part corresponding to the first operation unit 702 can change the angle of rotation of the joint 171 stepwise in the direction of the arrow in the second icon 505.

The first operation unit 703, the first operation unit 704, the first icon 506, and the second icon 507 are displayed, arrayed in this order from the right below the first operation unit 701, the first operation unit 702, the first icon 504, and the second icon 505.

A sign "+" is displayed on the first operation unit 703. Pressing a part corresponding to the first operation unit 703 can change the angle of rotation of the joint 172 stepwise in the direction of the arrow in the first icon 506.

A sign "−" is displayed on the first operation unit 704. Pressing a part corresponding to the first operation unit 704 can change the angle of rotation of the joint 172 stepwise in the direction of the arrow in the second icon 507.

The first operation unit 705, the first operation unit 706, the first icon 508, and the second icon 509 are displayed, arrayed in this order from the right below the first operation unit 703, the first operation unit 704, the first icon 506, and the second icon 507.

A sign "+" is displayed on the first operation unit 705. Pressing a part corresponding to the first operation unit 705 can change the angle of rotation of the joint 173 stepwise in the direction of the arrow in the first icon 508.

A sign "−" is displayed on the first operation unit 706. Pressing a part corresponding to the first operation unit 706 can change the angle of rotation of the joint 173 stepwise in the direction of the arrow in the second icon 509.

The first operation unit 707, the first operation unit 708, the first icon 514, and the second icon 515 are displayed, arrayed in this order from the right below the first operation unit 705, the first operation unit 706, the first icon 508, and the second icon 509.

A sign "+" is displayed on the first operation unit 707. Pressing a part corresponding to the first operation unit 707 can change the angle of rotation of the joint 174 stepwise in the direction of the arrow in the first icon 514.

A sign "−" is displayed on the first operation unit 708. Pressing a part corresponding to the first operation unit 708 can change the angle of rotation of the joint 174 stepwise in the direction of the arrow in the second icon 515.

The first operation unit 709, the first operation unit 710, the first icon 516, and the second icon 517 are displayed, arrayed in this order from the right below the first operation unit 707, the first operation unit 708, the first icon 514, and the second icon 515.

A sign "+" is displayed on the first operation unit 709. Pressing a part corresponding to the first operation unit 709 can change the angle of rotation of the joint 175 stepwise in the direction of the arrow in the first icon 516.

A sign "−" is displayed on the first operation unit 710. Pressing a part corresponding to the first operation unit 710 can change the angle of rotation of the joint 175 stepwise in the direction of the arrow in the second icon 517.

The first operation unit 711, the first operation unit 712, the first icon 518, and the second icon 519 are displayed, arrayed in this order from the right below the first operation unit 709, the first operation unit 710, the first icon 516, and the second icon 517.

A sign "+" is displayed on the first operation unit 711. Pressing a part corresponding to the first operation unit 711 can change the angle of rotation of the joint 176 stepwise in the direction of the arrow in the first icon 518.

A sign "−" is displayed on the first operation unit 712. Pressing a part corresponding to the first operation unit 712 can change the angle of rotation of the joint 176 stepwise in the direction of the arrow in the second icon 519.

By giving a teaching while suitably pressing such first operation units 701 to 712 to change the attitude of the robot arm 10, the worker can give a teaching while rotating the joints 171 to 176 stepwise.

In this way, the first operation units 701 to 712 have a button that can change the angle of rotation of each joint stepwise. Thus, the attitude of the robot arm 10 can be changed more accurately than in the first embodiment.

The teaching device, the teaching method, and the teaching program according to the present disclosure have been described above, based on the illustrated embodiments. However, the present disclosure is not limited to these embodiments. Each configuration or process in the teaching device, the teaching method, and the teaching program can be replaced with any configuration or process that can achieve similar functions. Also, any process may be added.

The screen shown in FIGS. 3 and 4 may be a screen for beginner. An experienced worker may select an expert screen (for example, FIG. 5 in JP-A-2006-289531) instead of selecting the screen shown in FIGS. 3 and 4 and then give a teaching thereon. Also, the teaching device, the teaching method, and the teaching program may be configured to include two types of operation modes, that is, a beginner mode and an expert mode. The user may be allowed to select one of the two types of operation modes. In the beginner mode, a screen for beginner may be displayed. In the expert mode, an expert screen may be displayed.

Figure 9:
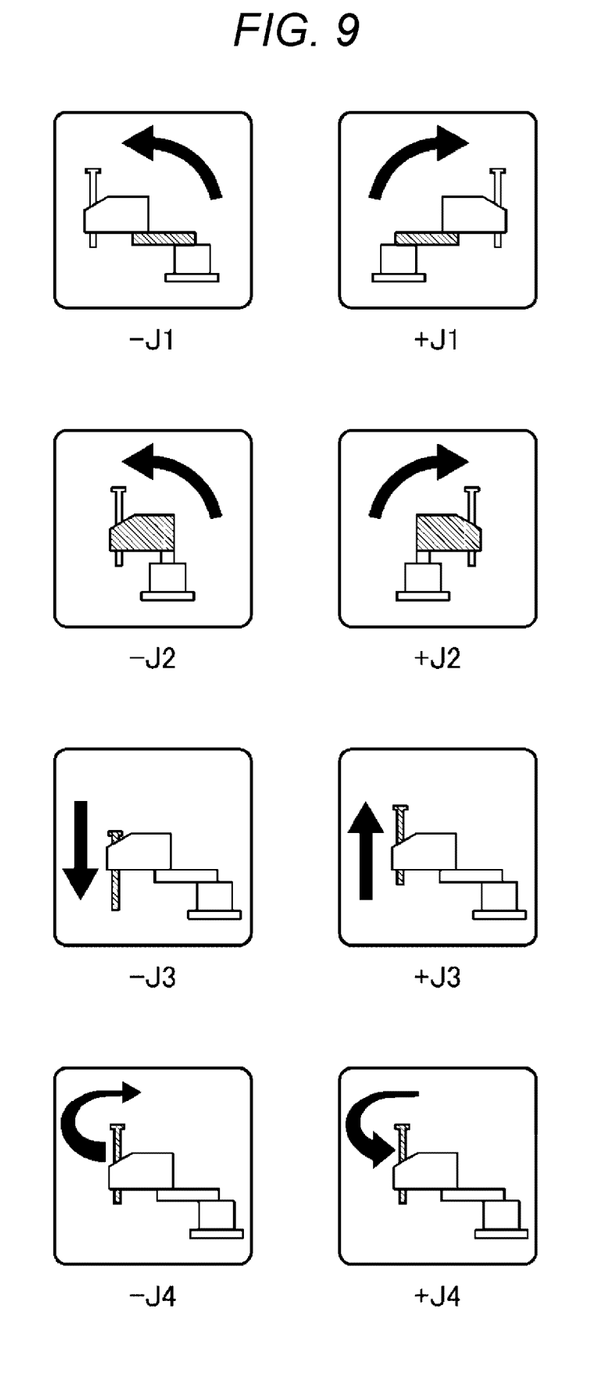
FIG. 9 shows an example of the first icon and the second icon showing a SCARA robot.

In the description of the embodiments, a 6-axis multi-joint robot is employed. However, the present disclosure is also applicable to a horizontal articulated robot, that is, a so-called SCARA robot. In this case, the first operation unit, the first icon, and the second icon can be configured as shown in FIG. 9, for example.

What is claimed is:

1. A teaching device generating an operation program for executing an operation of a robot having a base and a robot arm including a proximal arm coupled to the base and a distal arm coupled to a side opposite to the base of the proximal arm, the teaching device comprising:
   a display unit displaying
      a first operation unit accepting an operation of designating the proximal arm of the robot arm and changing an attitude of the robot arm and
      a second operation unit accepting an operation of designating a position of a control point set for the robot arm and changing the attitude of the robot arm; and
   an operation program generation unit generating the operation program, based on the attitude designated at the first operation unit or the second operation unit, wherein the display unit has a switching button for switching between a mode for accepting an operation of designating the proximal arm and changing the attitude of the robot arm and a mode for accepting an operation of designating the distal arm and changing the attitude of the robot arm.

2. The teaching device according to claim 1, wherein
the first operation unit is configured to accept an operation of changing the attitude of the robot arm in a joint coordinate system set for a joint of the robot arm, and
the second operation unit is configured to accept an operation of changing the attitude of the robot arm in a world coordinate system set for a space where the robot exists.

3. The teaching device according to claim 1, wherein
the display unit displays the first operation unit and the second operation unit, arrayed along one direction.

4. The teaching device according to claim 1, wherein
the robot arm has a first arm coupled to the base, a second arm coupled to the first arm, a third arm coupled to the second arm, a fourth arm coupled to the third arm, a fifth arm coupled to the fourth arm, and a sixth arm coupled to the fifth arm,
the first arm, the second arm, and the third arm belong to the proximal arm, and
the fourth arm, the fifth arm, and the sixth arm belong to the distal arm.

5. The teaching device according to claim 1, wherein
the proximal arm has a joint,
the display unit is also configured to display a first icon showing a first attitude of the robot arm that is a state where an angle of the joint is a first angle and a second icon showing a second attitude of the robot arm that is a state where the angle of the joint is a second angle that is different from the first angle, and
the first operation unit is configured to accept an operation of designating a third attitude of the robot arm that is a state where the angle of the joint is a third angle equal to or greater than the first angle and equal to or smaller than the second angle.

6. The teaching device according to claim 1, wherein
the display unit has a virtual robot display unit displaying a virtual robot, and
the virtual robot in an attitude linked to an operation of the first operation unit is displayed on the virtual robot display unit.

7. A teaching method comprising:
a display step of displaying a first operation unit accepting an operation of designating a proximal arm of a robot arm and changing an attitude of the robot arm and a second operation unit accepting an operation of designating a position of a control point set for the robot arm and changing the attitude of the robot arm;
an operation program generation step of generating an operation program for executing an operation of a robot having the robot arm, based on the attitude designated at the first operation unit or the second operation unit; and
a switching step of switching between a mode for accepting an operation of designating the proximal arm and changing the attitude of the robot arm and a mode for accepting an operation of designating the distal arm and changing the attitude of the robot arm.

8. A recording medium storing a teaching program, the teaching program causing a processor to execute:
processing of displaying a first operation unit accepting an operation of designating a proximal arm of a robot arm and changing an attitude of the robot arm and a second operation unit accepting an operation of designating a position of a control point set for the robot arm and changing the attitude of the robot arm;
processing of generating an operation program for executing an operation of a robot having the robot arm, based on the attitude designated at the first operation unit or the second operation unit; and
processing of switching between a mode for accepting an operation of designating the proximal arm and changing the attitude of the robot arm and a mode for accepting an operation of designating the distal arm and changing the attitude of the robot arm.

9. A teaching device generating an operation program for executing an operation of a robot having a base and a robot arm including a proximal arm coupled to the base and a distal arm coupled to a side opposite to the base of the proximal arm, the teaching device comprising:
a display unit displaying
a first operation unit accepting an operation of designating the proximal arm of the robot arm and changing an attitude of the robot arm and
a second operation unit accepting an operation of designating a position of a control point set for the robot arm and changing the attitude of the robot arm; and
an operation program generation unit generating the operation program, based on the attitude designated at the first operation unit or the second operation unit,
wherein the proximal arm has a joint,
the display unit is also configured to display a first icon showing a first attitude of the robot arm that is a state where an angle of the joint is a first angle and a second icon showing a second attitude of the robot arm that is a state where the angle of the joint is a second angle that is different from the first angle, and
the first operation unit is configured to accept an operation of designating a third attitude of the robot arm that is a state where the angle of the joint is a third angle equal to or greater than the first angle and equal to or smaller than the second angle.

* * * * *